US012694121B2

(12) United States Patent
Bulusu et al.

(10) Patent No.: US 12,694,121 B2
(45) Date of Patent: Jul. 28, 2026

(54) LIMITING A NUMBER OF ILLEGITIMATE INTERRUPTS FROM SWITCHING A CENTRAL PROCESSING UNIT TO A SYSTEM MANAGEMENT MODE

(71) Applicant: MICROSOFT TECHNOLOGY LICENSING, LLC, Redmond, WA (US)

(72) Inventors: Mallik Bulusu, Bellevue, WA (US); Muhammad A. Ahmed, Seattle, WA (US); Ganesh Kumar A, Hyderabad (IN); Kiran Bangalore Sathyanarayana, Bangalore (IN); Pingfan Song, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 264 days.

(21) Appl. No.: 18/135,694

(22) Filed: Apr. 17, 2023

(65) Prior Publication Data

US 2024/0346152 A1     Oct. 17, 2024

(51) Int. Cl.
*G06F 21/00* (2013.01)
*G06F 21/12* (2013.01)
*G06F 21/57* (2013.01)

(52) U.S. Cl.
CPC .......... *G06F 21/577* (2013.01); *G06F 21/126* (2013.01)

(58) Field of Classification Search
CPC .............................. G06F 21/126; G06F 21/577
See application file for complete search history.

(56) References Cited

U.S. PATENT DOCUMENTS

| | | | | |
|---|---|---|---|---|
| 2005/0182879 A1* | 8/2005 | Vu | .......................... | G06F 13/24 |
| | | | | 710/260 |
| 2011/0145461 A1* | 6/2011 | Zhao | ....................... | G06F 9/505 |
| | | | | 710/267 |
| 2018/0157525 A1 | 6/2018 | Song | | |
| 2023/0305834 A1* | 9/2023 | Kumar | ................. | G06F 9/4418 |
| 2024/0303192 A1* | 9/2024 | Zapatylak | ........... | G06F 11/0751 |

OTHER PUBLICATIONS

International Search Report and Written Opinion received for PCT Application No. PCT/US2024/024535, Jun. 20, 2024, 14 pages.
International Preliminary Report on Patentability (Chapter I) received for PCT Application No. PCT/US2024/024535, Oct. 30, 2025, 08 pages.

* cited by examiner

*Primary Examiner* — Jeffrey C Pwu
*Assistant Examiner* — Thong P Truong
(74) *Attorney, Agent, or Firm* — Newport IP, LLC; Jacob P. Rohwer

(57) ABSTRACT

Disclosed herein is a system for limiting the rate at which system management interrupts can suspend normal execution of a central processing unit (CPU) by switching the operating mode of the CPU from one of the real mode or the protected mode to the system management mode. The rate limits imposed by the system provides a protective layer against cyberattacks (e.g., a distributed denial-of-service (DDoS) attack) from malicious actors and ensures the CPU can be more efficient regarding the execution of workloads (e.g., processing threads).

20 Claims, 7 Drawing Sheets

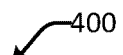

DEFINE A THRESHOLD NUMBER OF INTERRUPTS THAT ARE ALLOWED TO SWITCH THE OPERATING MODE OF THE CENTRAL PROCESSING UNIT FROM THE REAL OPERATING MODE OR THE PROTECTED OPERATING MODE TO THE SYSTEM MANAGEMENT OPERATING MODE
402

TRACK A NUMBER OF INTERRUPTS THAT HAVE BEEN ALLOWED TO SWITCH THE OPERATING MODE OF THE CENTRAL PROCESSING UNIT FROM THE REAL OPERATING MODE OR THE PROTECTED OPERATING MODE TO THE SYSTEM MANAGEMENT OPERATING MODE
404

DETERMINE, BASED ON THE TRACKING, THAT THE NUMBER OF INTERRUPTS HAS SATISFIED THE THRESHOLD NUMBER OF INTERRUPTS
406

PREVENT, BASED ON THE DETERMINING, ADDITIONAL INTERRUPTS FROM BEING ALLOWED TO SWITCH THE OPERATING MODE OF THE CENTRAL PROCESSING UNIT FROM THE REAL OPERATING MODE OR THE PROTECTED OPERATING MODE TO THE SYSTEM MANAGEMENT OPERATING MODE
408

FIG. 4

LIMITING A NUMBER OF ILLEGITIMATE INTERRUPTS FROM SWITCHING A CENTRAL PROCESSING UNIT TO A SYSTEM MANAGEMENT MODE

BACKGROUND

Certain central processing units (CPUs) of computing devices (e.g., the x86 family of instruction set architectures initially developed by INTEL) can be operated in different operating modes (referred to herein as "modes"). The different modes include a real mode, a protected mode, and a system management mode. When operating in the real mode, a memory address used by the CPU of a computing device (e.g., a network server) corresponds to real locations in memory. However, when operating in the real mode, the operating system of the computing device is unable to multitask. When operating in the protected mode, the operating system of the computing device is able to implement virtual memory, and thus, the operating system is able to safely multitask.

A CPU of a computing device typically starts in real mode (e.g., to implement a boot sequence) and then the operating system switches the operating mode of the CPU from the real mode to the protected mode. The CPUs in network servers, for example, prefer to operate in the protected mode so multiple workloads can be performed on behalf of cloud tenant(s). Operating the CPU in either the real mode or the protected mode if often referred to as enabling "normal" execution of the CPU.

When the CPU is switched to the system management mode, the normal execution of the CPU is suspended. The system management mode provides a distinct processing environment that is isolated from the operating system and/or software applications. That is, the CPU executes system management mode code in a separate address space (e.g., System Management Random Access Memory (SM-RAM)) that is inaccessible when the CPU is operating in the real mode and the protected mode. Consequently, by switching the CPU to the system management mode, control of the CPU is taken away from the operating system of the computing device.

The CPU can be switched to the system management mode via the invocation of a system management interrupt (SMI). One challenge related to system management interrupts is that they are not targeted. For instance, a system management interrupt may be invoked due to a memory error that occurs in relation to execution of a specific processing thread executing on the CPU, as supported by the operating system. However, the system management interrupt, when invoked, does not target (e.g., identify) the specific processing thread executing on the CPU for suspension. Rather, when the system management interrupt is invoked and the CPU switches to the system management mode so that the system management interrupt can be serviced, all the processing threads concurrently executing on the CPU (e.g., a single core CPU, a multi-core CPU) are abruptly suspended.

Therefore, the use of system management interrupts disrupts multiple workloads executing via the CPU on behalf of cloud tenants. The disruption of multiple workloads provides an avenue for malicious actors to wield a cyberattack. For instance, a malicious actor may unleash a distributed denial-of-service (DDoS) attack through rogue software executed by a compromised operating system by requesting that a large number of illegitimate system management interrupts be invoked. In a cloud system (e.g., one or more datacenters) that includes thousands or even millions of network servers, the ability to inflict this type of damage can lead to severe consequences such as processing delays, increased costs, frustrated customers, etc.

SUMMARY

The techniques disclosed herein implement a system that limits the rate at which system management interrupts can suspend normal execution of a central processing unit (CPU) by switching the operating mode of the CPU from one of the real mode or the protected mode to the system management mode. The rate limits imposed by the system provides a protective layer against cyberattacks (e.g., a distributed denial-of-service (DDoS) attack) from malicious actors and ensures the CPU can be more efficient regarding the execution of workloads (e.g., processing threads).

The system management interrupts described herein are out-of-band system management interrupts because they are handled by a firmware agent and not the operating system. The firmware agent is tasked with invoking system management interrupts based on interrupt invocation requests that are received. In one example, the firmware agent is a baseboard management controller (BMC). However, other types of firmware installed on a main circuit board of a computing device can serve as the firmware agent described herein.

A BMC is a service processor that is capable of monitoring the physical state of the device memory, other hardware components, and/or peripheral devices using sensors and/or other mechanisms. The BMC is configured on the main circuit board of a computing device (e.g., a network server) and can implement remote communications via a shared or a dedicated network interface card (NIC). In one example, a BMC is configured to perform tasks that otherwise would need to be performed by a user physically visiting the network server in a server rack. For example, considering a cloud platform (e.g., AMAZON WEB SERVICES, GOOGLE CLOUD PLATFORM, MICROSOFT AZURE) with a large number of network servers executing cloud tenant workloads via a data plane, the BMC is part of a manageability subsystem that forms part of a control plane in the cloud platform. The control plane can be used to collect telemetry data across the network servers for administrative or operational purposes. Consequently, the BMC is configured to harvest and report the telemetry data for the network servers configured within datacenter(s) of a cloud platform.

Accordingly, the BMC is configured to perform monitoring operations and/or invoke system management interrupts based on the monitoring operations and/or interrupt invocation requests (e.g., received from the operating system). There are different types of system management interrupts. For example, a first type of a system management interrupt can be invoked to manage or debug an error in system hardware (e.g., a memory error, a chipset error, etc.). A second type of system management interrupt can be invoked to implement telemetry harvesting (e.g., via a telemetry dump request). A third type of system management interrupt can be invoked to implement a power control function (e.g., managing a voltage regulator module). A fourth type of system management interrupt can be invoked to implement a safety function (e.g., a device shutdown operation due to an elevated CPU temperature). A fifth type of system management interrupt can be invoked to install a firmware update (e.g., a Unified Extensible Firmware Interface (UEFI) update). These specific types of system management interrupts are provided as examples, and it is understood in the context of this disclosure that other types of system management interrupts can be invoked to cause the CPU to switch from either the real mode or the protected mode to the system management mode.

The firmware agent described herein, such as a BMC, is configured to limit a number of illegitimate interrupts that can be invoked to switch an operating mode of a CPU from the real mode or the protected mode to the system management mode. The firmware agent defines a threshold number of interrupts that are allowed to be invoked. The firmware agent then tracks a number of interrupts that have been allowed to be invoked and determines that the number of interrupts has satisfied (e.g., reached, met) the threshold number of interrupts. Once the number of interrupts has satisfied the threshold number of interrupts, the firmware agent prevents additional interrupts from being invoked. This limits a rate at which illegitimate interrupts can disrupt the normal execution of the CPU. As mentioned above, the illegitimate interrupts may be part of a DDoS attack that requests a large number of system management interrupts in a short period of time. Other device compromises, vulnerabilities, and/or susceptibilities may lead to other types of cyberattacks that disrupts the normal execution of the CPU via the use of interrupts.

The firmware agent is configured to define the threshold number of interrupts for a predetermined period of time (e.g., one hour, one day, one week). Thus, the tracking implemented by the firmware agent is implemented during the predetermined period of time. Upon expiration of the predetermined period of time, the tracking restarts for the next predetermined period of time (e.g., the next hour, the next day, the next week). More specifically, upon expiration of the predetermined period of time, the number of interrupts being tracked is reset to zero.

In one implementation, the threshold number of interrupts is statically defined for the predetermined period of time. For instance, an administrative user may define the threshold number of interrupts that are allowed to be invoked for a computing device during the predetermined period of time.

In another implementation, the threshold number of interrupts is dynamically defined for the predetermined period of time. For instance, the firmware agent can include an artificial intelligence model configured to analyze the interrupt invocation requests received over an extended period of time, which includes a number of consecutive predetermined period of times (e.g., the last one hundred or one thousand hours, the last one hundred days, the last ten weeks). The artificial intelligence model is then configured to predict, as an output, a frequency with which legitimate interrupts are requested for a predetermined period of time. The threshold number of interrupts can be established based on the predicted frequency. Moreover, the analysis performed by the artificial intelligence model can continue such that the threshold number of interrupts is continually updated, or dynamically changes, based on the predicted output. Consequently, the operational goal of the threshold number of interrupts is to allow legitimate interrupts to be invoked but prevent illegitimate interrupts from being invoked.

In various examples described herein, the threshold number of interrupts is defined for a particular type of interrupt. Moreover, the threshold number of interrupts, as defined for different types of interrupts, can be stored in a table that can be referenced when an interrupt invocation request is received. The firmware agent may include different interfaces at which interrupt invocation requests are received, and these different interfaces may respectively correspond to the different types of interrupts. Accordingly, a type of interrupt is associated with an entry in the table and, when an interruption invocation request is received at an interface that corresponds to the type of interrupt, the firmware agent maps the interrupt invocation request to the entry in the table to determine whether invocation of the interrupt should be allowed or prevented.

The firmware agent is configured to invoke a system management interrupt via the toggling a General-Purpose Input-Output (GPIO) pin. The toggled GPIO pin generates and sends an interrupt signal to the CPU to suspend normal execution and switch from either the real mode or the protected mode to the system management mode so that the interrupt can be serviced. In various examples, a particular type of interrupt has its own dedicated GPIO pin so the CPU can discern between different types of interrupts.

Consequently, the system described herein limits the rate at which system management interrupts can suspend normal execution of the CPU. The rate limits imposed by the system provides a protective layer against cyberattacks (e.g., a distributed denial-of-service (DDoS) attack) from malicious actors and ensures the CPU can be more efficient regarding the execution of workloads (e.g., processing threads). Other technical benefits can be realized by the system described herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 illustrates an example flow diagram of an example method for limiting the rate at which system management interrupts can suspend normal execution of a central processing unit (CPU).

DETAILED DESCRIPTION

The following Detailed Description discloses techniques and technologies for limiting the rate at which system management interrupts can suspend normal execution of a central processing unit (CPU) by switching the operating mode of the CPU from one of the real mode or the protected mode to the system management mode. The rate limits imposed by the system provides a protective layer against cyberattacks (e.g., a distributed denial-of-service (DDoS) attack) from malicious actors and ensures the CPU can be more efficient regarding the execution of workloads (e.g., processing threads). Various examples, scenarios, and aspects are described below with reference to FIGS. 1-6.

Figure 1:
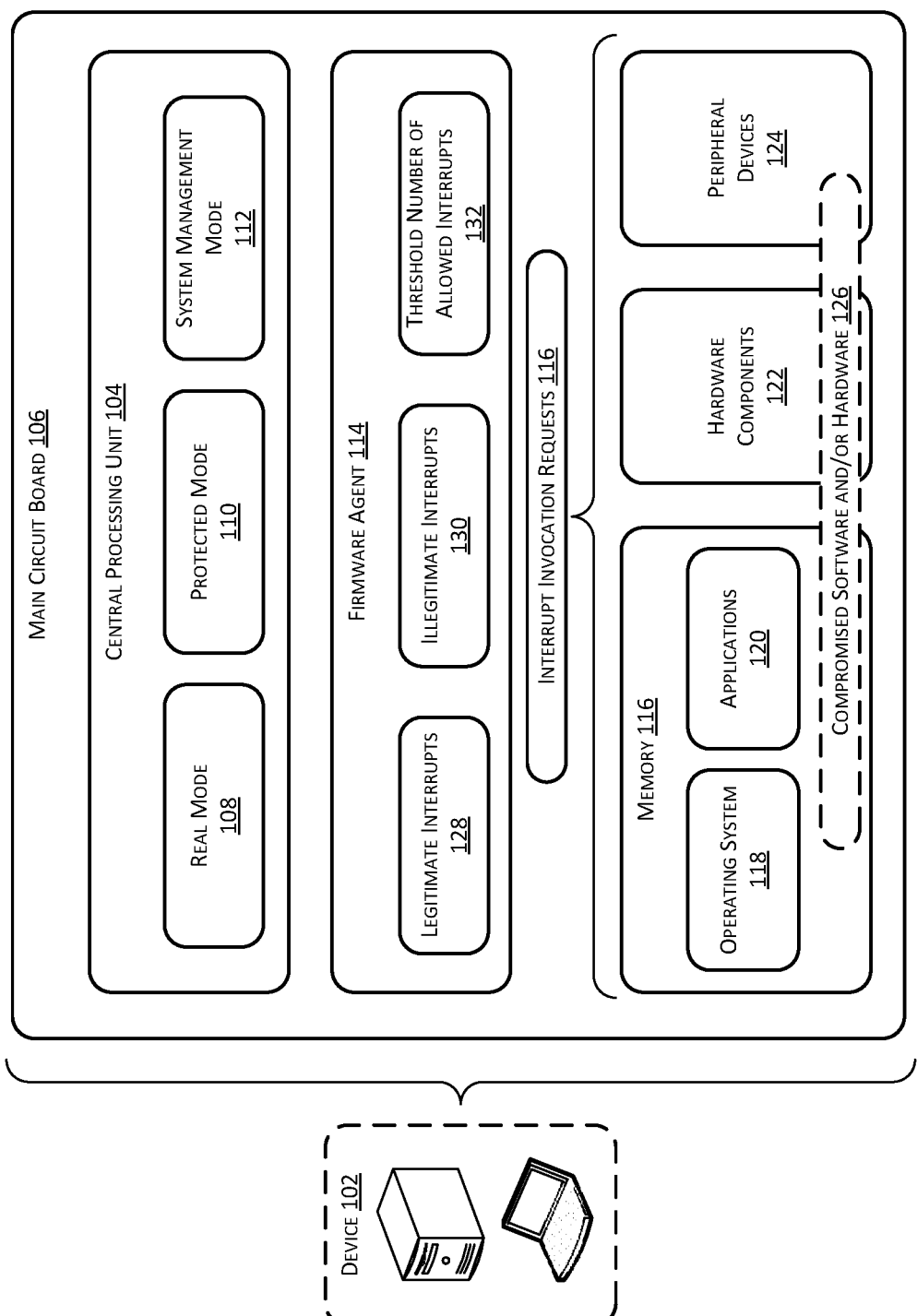
FIG. 1 illustrates an example environment in which a computing device (e.g., a network server) is configured to limit the rate at which system management interrupts can suspend normal execution of a central processing unit (CPU).

FIG. 1 illustrates an example environment in which a computing device 102 (e.g., a network server) is configured to limit the rate at which system management interrupts can suspend normal execution of a central processing unit (CPU) 104. As shown, the computing device 102 includes a main circuit board 106 (alternatively referred to as the "mother" board), to which the CPU 104 is connected. As described above, the CPU 104 can be operated in a real mode 108, a protected mode 110, and a system management mode 112, and operating the CPU 104 in either the real mode 108 or the protected mode 110 if often referred to as enabling "normal" execution of the CPU.

When the CPU 104 is switched to the system management mode 112, the normal execution of the CPU 104 is suspended. This is because the system management mode 112 provides a distinct processing environment that is isolated from the operating system and/or software applications. That is, the CPU 104 executes system management mode code in a separate address space (e.g., System Management Random Access Memory (SMRAM)) that is inaccessible when the CPU 104 is operating in the real mode 108 and the protected mode 110. Consequently, by switching the CPU 104 to the system management mode 112, control of the CPU 104 is taken away from the operating system of the computing device 102.

The CPU 104 can be switched to the system management mode 112 via the invocation of a system management interrupt (SMI). The system management interrupts described herein are out-of-band system management interrupts because they are handled by a firmware agent 114 and not the operating system of the computing device 102. The firmware agent 114 is tasked with invoking system management interrupts based on interrupt invocation requests 116. In one example further described below with respect to FIGS. 2A-2B, the firmware agent 114 is a baseboard management controller (BMC). However, other types of firmware installed on the main circuit board 106 of a computing device 102 can serve as the firmware agent 114 described herein.

The firmware agent 114 is tasked with monitoring the physical state of the device memory 116, on which the aforementioned operating system 118 and other applications 120 are stored, hardware components 122, and/or peripheral devices 124 using sensors and/or other mechanisms. Accordingly, the firmware agent 114 is configured to perform monitoring operations and/or invoke system management interrupts based on the monitoring operations and/or the interrupt invocation requests 116 (e.g., received from the operating system 118, the hardware components 122, and/or the peripheral devices 124).

Unfortunately, not all the interrupt invocation requests 116 received by the firmware agent 114 are legitimate. For example, compromised software and/or hardware 126 can issue illegitimate interrupt invocation requests as part of a cyberattack to disrupt the normal execution of the CPU 104. Therefore, FIG. 1 illustrates that the firmware agent 114 has legitimate interrupts 128 to invoke and illegitimate interrupts 130 to invoke. However, since a system management interrupt does not target (e.g., identify) a specific processing thread executing on the CPU 104 for suspension, all processing threads concurrently executing on the CPU 104 (e.g., a single core CPU, a multi-core CPU) are abruptly suspended. As mentioned above, this universal suspension can severely impact a cloud platform, as a large number of workloads executing for various cloud tenants are disrupted (e.g., delayed).

Accordingly, the firmware agent 114 is configured to limit a number of the illegitimate interrupts 130 by defining a threshold number of interrupts 132 that are allowed to be invoked. As described in further detail below, the firmware agent 114 tracks a number of interrupts that have already been allowed to be invoked and determines when the number of interrupts has satisfied (e.g., reached, met) the threshold number of interrupts 312 that are allowed to be invoked. Once the number of interrupts has satisfied the threshold number of interrupts 132 that are allowed to be invoked, the firmware agent 114 prevents additional interrupts from being invoked. This limits a rate at which illegitimate interrupts 130 can disrupt the normal execution of the CPU 104.

Figure 2A:
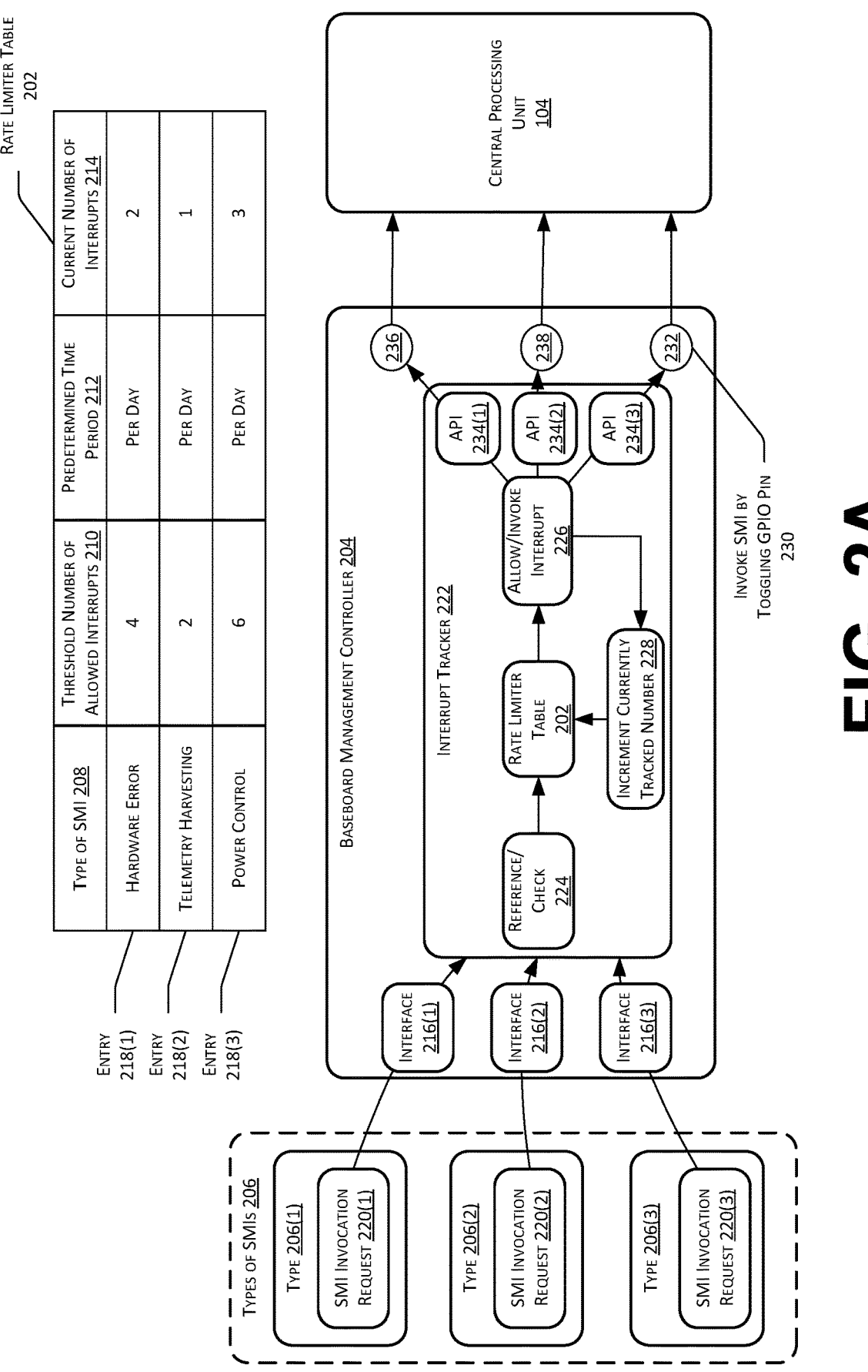
FIG. 2A illustrates an expanded version of the example environment of FIG. 1, where a rate limiter table is created, maintained, and referenced in a firmware agent to limit the rate at which system management interrupts can suspend normal execution of the CPU.

FIG. 2A illustrates an expanded version of the example environment of FIG. 1, where a rate limiter table 202 is created, maintained, and referenced in the firmware agent 114 to limit the rate at which system management interrupts can suspend normal execution of the CPU 104. In FIG. 2A, the firmware agent is a baseboard management controller (BMC) 204. As described above, the BMC 204 is configured on the main circuit board 106 of a computing device 102 (e.g., a network server) and can implement remote communications via a shared or a dedicated network interface card (NIC).

In one example, the BMC 204 is configured to perform tasks that otherwise would need to be performed by a user physically visiting the network server in a server rack. For example, considering a cloud platform (e.g., AMAZON WEB SERVICES, GOOGLE CLOUD PLATFORM, MICROSOFT AZURE) with a large number of network servers executing cloud tenant workloads via a data plane, the BMC 204 is part of a manageability subsystem that forms part of a control plane in the cloud platform. The control plane can be used to collect telemetry data across the network servers for administrative or operational purposes. Consequently, the BMC 204 is configured to harvest and report the telemetry data for the network servers configured within datacenter(s) of a cloud platform.

There are different types 206 of system management interrupts (SMIs) that are handled by the BMC 204. For example, a first type of a system management interrupt 206(1) can be invoked to manage or debug an error in system hardware (e.g., a memory error, a chipset error, etc.). A second type of a system management interrupt 206(2) can be invoked to implement telemetry harvesting (e.g., via a telemetry dump request). A third type of a system management interrupt 206(3) can be invoked to implement a power control function (e.g., managing a voltage regulator module). These three types of system management interrupts are illustrated with respect to FIGS. 2A-2B for ease of discussion. However, it is understood in the context of this disclosure that other types of system management interrupts can be invoked to cause the CPU 104 to switch from either the real mode or the protected mode to the system management mode For instance, another type of system management interrupt can be invoked to implement a safety function (e.g., a device shutdown operation due to an elevated CPU temperature) or to install a firmware update (e.g., a Unified Extensible Firmware Interface (UEFI) update).

As described above, the BMC 204 is configured to define a threshold number of interrupts 132 that are allowed to be invoked. In FIG. 2A, the BMC 204 defines threshold numbers of interrupts for different types of system management interrupts and stores the information in the rate limiter table 202. As illustrated, the rate limiter table 202 includes a structure with a column that specifies the type of system management interrupt 208, a column that specifies the threshold number of allowed interrupts 210, a column that specifies a predetermined time period in which the rate of system management interrupts is limited 212, and a column that specifies the current number of interrupts that have been allowed to be invoked 214.

In addition to defining the threshold number of allowed interrupts 132 as specified in column 210, the BMC 204 is configured to define a predetermined period of time (e.g., one hour, one day, one week) for the rate limiting. Thus, the tracking implemented by the BMC 204 is implemented during the predetermined period of time. Upon expiration of the predetermined period of time, the tracking restarts for the next predetermined period of time (e.g., the next hour, the next day, the next week). More specifically, upon expiration of the predetermined period of time, the current number of interrupts 214 resets to zero.

The BMC 204 can include different interfaces 216(1-3) at which interrupt invocation requests are received, and these different interfaces 216(1-3) may respectively correspond to the different types of interrupts 206(1-3). Moreover, a type of interrupt is associated with an entry in the rate limiter table 202. For instance, the type of SMI 206(1) corresponds to an entry 218(1) in the rate limiter table 202 that specifies a hardware error. The type of SMI 206(2) corresponds to an entry 218(2) in the rate limiter table 202 that specifies telemetry harvesting. The type of SMI 206(3) corresponds to an entry 218(3) in the rate limiter table 202 that specifies power control.

Consequently, when the BMC 204 receives an interrupt invocation request 220(1) of type 206(1) at interface 216(1), the BMC 204 maps the interrupt invocation request 220(1) to entry 218(1) in the rate limiter table 202 to determine whether invocation of the interrupt should be allowed or prevented. Similarly, when the BMC 204 receives an interrupt invocation request 220(2) of type 206(2) at interface 216(2), the BMC 204 maps the interrupt invocation request 220(2) to entry 218(2) in the rate limiter table 202 to determine whether invocation of the interrupt should be allowed or prevented. And when the BMC 204 receives an interrupt invocation request 220(3) of type 206(3) at interface 216(3), the BMC 204 maps the interrupt invocation request 220(3) to entry 218(3) in the rate limiter table 202 to determine whether invocation of the interrupt should be allowed or prevented.

Figure 2B:
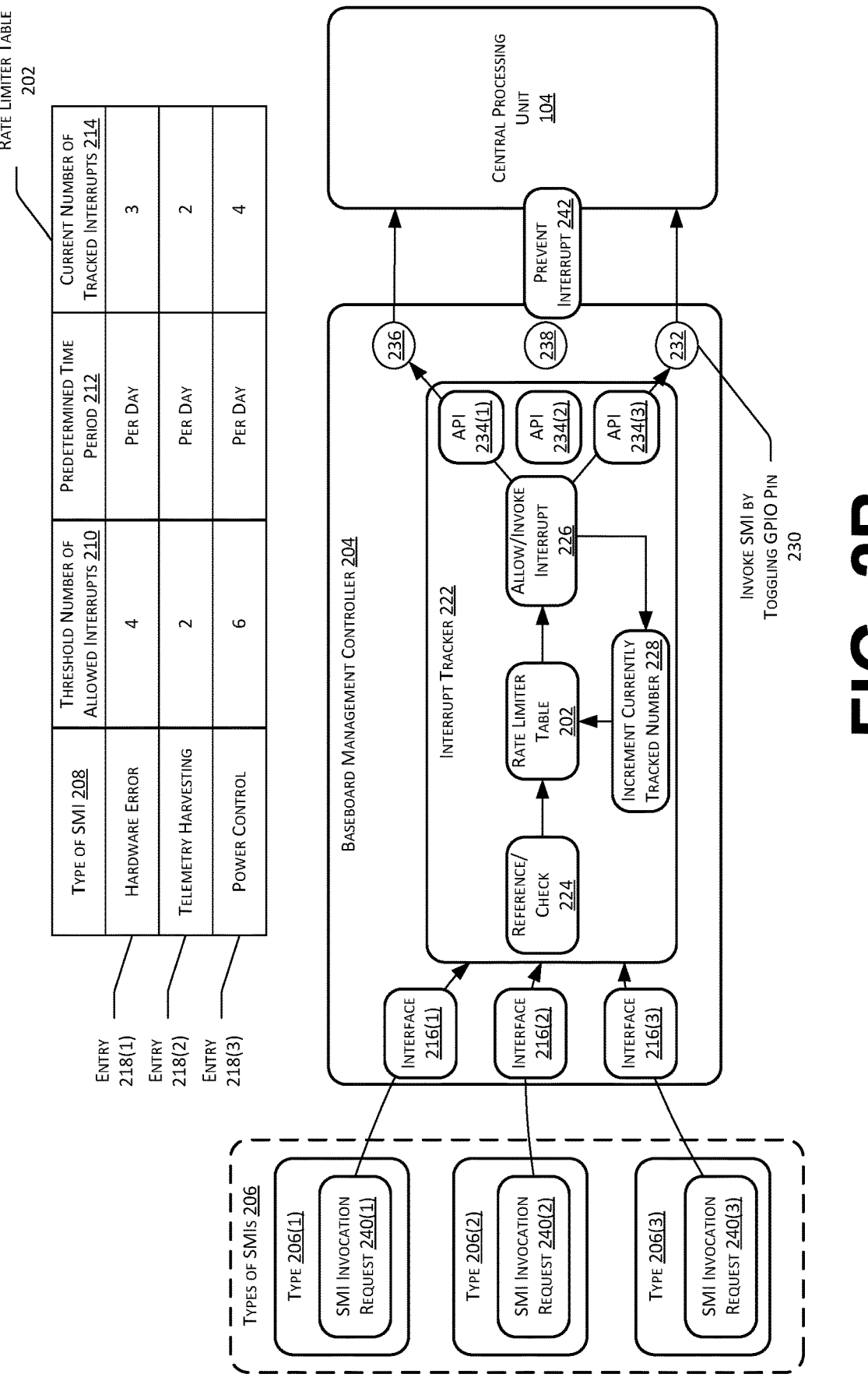
FIG. 2B illustrates the expanded version of the example environment of FIG. 1, as shown in FIG. 2A, at later time when a threshold number of allowed interrupts has been satisfied thereby preventing an interrupt from being invoked.

The BMC 204 includes an interrupt tracker 222 that receives the interrupt invocation requests 220(1-3) and references 224, or checks, the corresponding entries 218(1-3) in the rate limiter table 202 to determine whether invocation of an individual interrupt invocation request should be allowed or prevented. In the example of the hardware error interrupt type (i.e., type 206(1)), entry 218(1) indicates that four hardware error system management interrupts are allowed per day and, for the current day being tracked, the BMC 204 has already allowed two hardware error system management interrupts to be invoked. Accordingly, the interrupt tracker 222 allows invocation of an interrupt 226 based on interrupt invocation request 220(1) because the current number of interrupts (i.e., two) has not yet satisfied (e.g., is less than) the threshold number of allowed interrupts (i.e., four). Furthermore, the interrupt tracker 222 increments 228 the current number of interrupts after allowing/invoking the interrupt. That is, the number two in column 214 of entry 218(1) is incremented to three (as shown in FIG. 2B).

In the example of the telemetry harvesting interrupt type (i.e., type 206(2)), entry 218(2) indicates that two telemetry harvesting system management interrupts are allowed per day and, for the current day being tracked, the BMC 204 has already allowed one telemetry harvesting system management interrupt to be invoked. Accordingly, the interrupt tracker 222 allows invocation of an interrupt 226 based on interrupt invocation request 220(2) because the current number of allowed interrupts (i.e., one) has not yet satisfied the threshold number of allowed interrupts (i.e., two). Furthermore, the interrupt tracker 222 increments 228 the current number of interrupts after allowing/invoking the interrupt. That is, the number one in column 214 of entry 218(2) is incremented to two (as shown in FIG. 2B).

In the example of the power control interrupt type (i.e., type 206(3)), entry 218(3) indicates that six power control system management interrupts are allowed per day and, for the current day being tracked, the BMC 204 has already allowed three power control system management interrupts to be invoked. Accordingly, the interrupt tracker 222 allows invocation of an interrupt 226 based on interrupt invocation request 220(3) because the current number of allowed interrupts (i.e., three) has not yet satisfied the threshold number of allowed interrupts (i.e., six). Furthermore, the interrupt tracker 222 increments 228 the current number of interrupts after allowing/invoking the interrupt. That is, the number three in column 214 of entry 218(3) is incremented to four (as shown in FIG. 2B).

In various examples, once it is determined that a system management interrupt is allowed to be invoked, the BMC 204 invokes the system management interrupt by toggling 230 a General-Purpose Input-Output (GPIO) pin 232. The toggled GPIO pin 232 generates and sends an interrupt signal to the CPU 104 to suspend normal execution and switch from either the real mode or the protected mode to the system management mode so that the interrupt can be serviced. In various examples, each type of interrupt has its own dedicated GPIO pin so the CPU 104 can discern between different types of interrupts. For example, a system management interrupt of type 206(1) invoked based on interrupt invocation request 220(1) is mapped via an application programming interface 234(1) to GPIO pin 236. A system management interrupt of type 206(2) invoked based on interrupt invocation request 220(2) is mapped via an application programming interface 234(2) to GPIO pin 238. And a system management interrupt of type 206(3) invoked based on interrupt invocation request 220(3) is mapped via an application programming interface 234(3) to GPIO pin 232.

FIG. 2B illustrates the expanded version of the example environment of FIG. 1, as shown in FIG. 2A, but at later time when a threshold number of allowed interrupts for at least one type of system management interrupt has been satisfied thereby preventing an interrupt from being invoked. As shown, the rate limiter table 202 has been updated in FIG. 2B to reflect the allowed interrupts from FIG. 2A. Next, when the BMC 204 receives a next/new round of interrupt invocation requests 240(1-3), via interfaces 216(1-3), at times after the earlier round of interrupt invocation requests 220(1-3) are received (but within the same day), the interrupt tracker 222 performs the same process described above with respect to FIG. 2A.

Similar to the discussion of FIG. 2A, the interrupt tracker 222 in FIG. 2B allows invocation of an interrupt 226 based on interrupt invocation request 240(1) because the current number of allowed interrupts (i.e., three) in entry 218(1) has not yet satisfied the threshold number of allowed interrupts (i.e., four). The interrupt tracker 222 allows invocation of an interrupt 226 based on interrupt invocation request 240(3) because the current number of allowed interrupts (i.e., four) in entry 218(3) has not yet satisfied the threshold number of allowed interrupts (i.e., six). However, in FIG. 2B, the interrupt tracker 222 prevents invocation of an interrupt based on interrupt invocation request 240(2) because the current number of allowed interrupts (i.e., two) in entry 218(2) indicates that the threshold number of allowed interrupts (i.e., two) has been satisfied (i.e., the current number of allowed interrupts is already equal to the threshold). Therefore, the interrupt tracker 222 prevents the interrupt from being invoked, as shown via element 242, and the GPIO pin 238 is not toggled and no signal is sent to the CPU 104.

Figure 3:
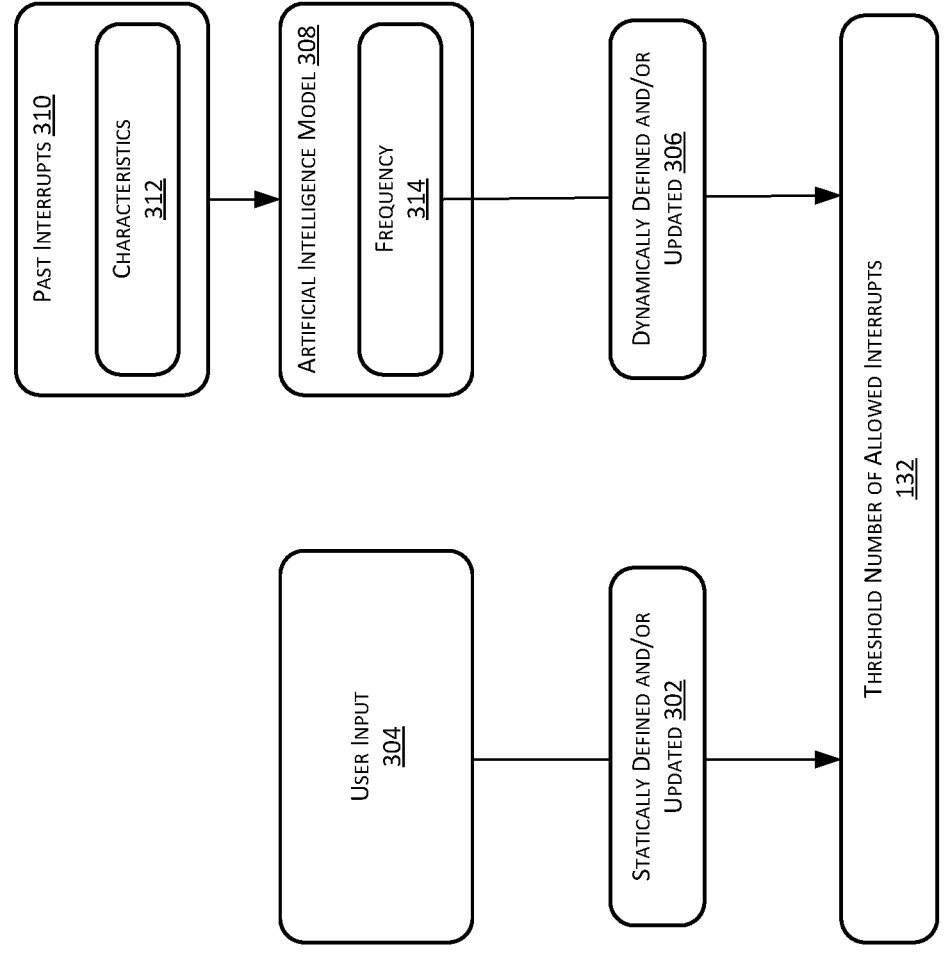
FIG. 3 illustrates an example diagram that shows how the threshold number of allowed interrupts can be defined and/or updated over time.

FIG. 3 illustrates an example diagram that shows how the threshold number of allowed interrupts 132 can be defined and/or updated over time. In one implementation, the threshold number of interrupts 132 is statically defined and/or updated 302 for the predetermined period of time based on user input 304. For instance, an administrative user can define the threshold numbers illustrated in the rate limiter table 202 of FIGS. 2A-2B.

In another implementation, the threshold number of interrupts 132 is dynamically defined and/or updated 306 for the predetermined period of time. For instance, the firmware agent 114 can include and/or have access to an artificial intelligence model 308 configured to receive and analyze past interrupts 310 (e.g., interrupt invocation requests, invoked system management interrupts) that occurred over an extended period of time. The extended period of time includes a number of consecutive predetermined period of times (e.g., the last one hundred or one thousand hours, the last one hundred days, the last ten weeks). The past interrupts 310 include characteristics 312 related to timing of the interrupts, types of the interrupts, and so forth. The artificial intelligence model 308 is then configured to predict, as an output, a frequency 314 with which legitimate interrupts 130 are requested for a predetermined period of time. The threshold number of interrupts 132 can be defined and/or updated based on the predicted frequency 314. Moreover, the analysis performed by the artificial intelligence model 308 can continue such that the threshold number of interrupts 132 is continually updated, or dynamically changes, based on the predicted frequency 314.

The artificial intelligence model 308 can be any one of various predictive models. For instance, the artificial intelligence model 308 can use any one of neural networks (e.g., convolutional neural networks, recurrent neural networks such as Long Short-Term TRansformer, etc.), Naïve Bayes, k-nearest neighbor algorithm, majority classifier, support vector machines, random forests, Classification and Regression Trees (CART), gradient-boosted decision trees (GBDTs), and so on.

Figure 5:
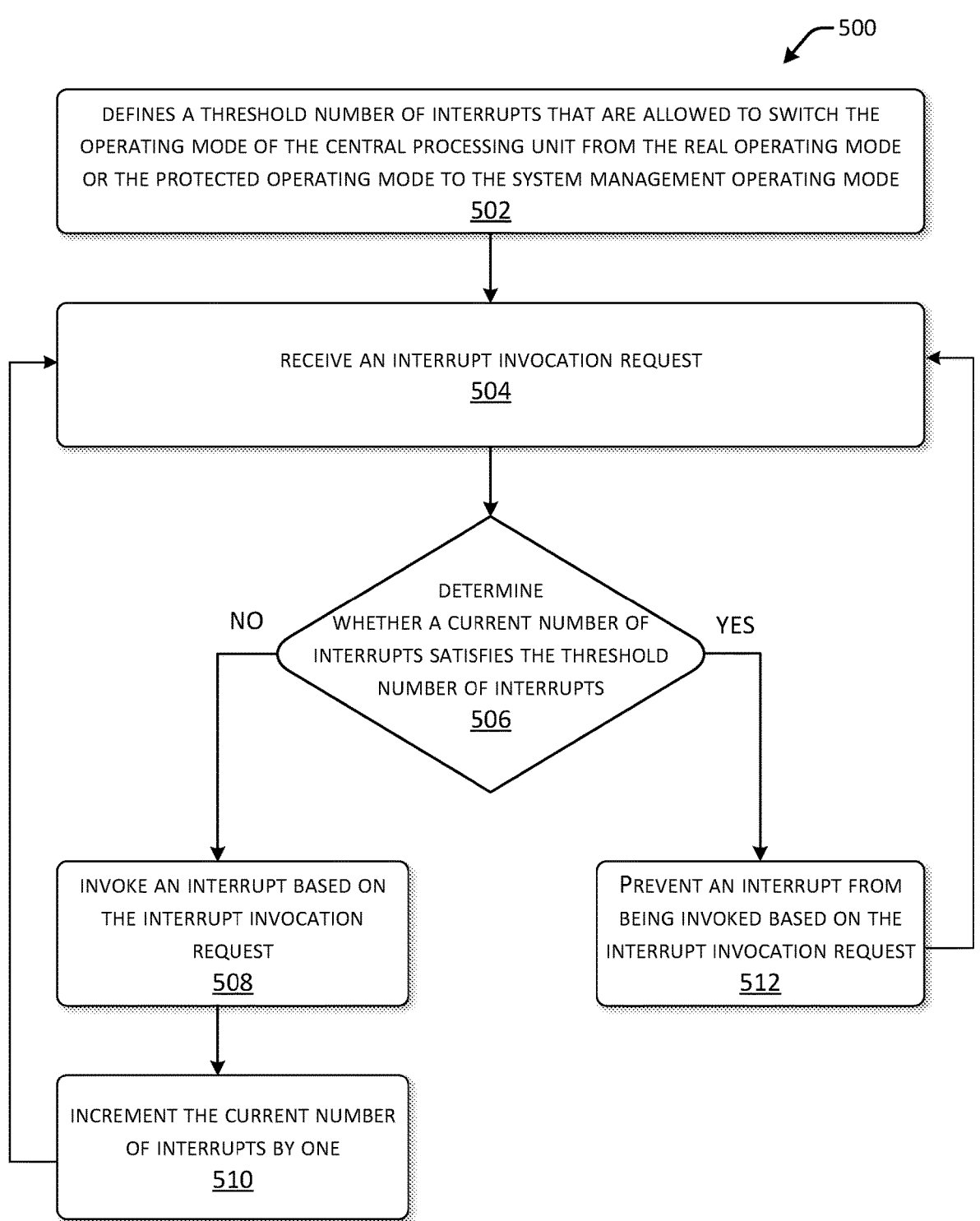
FIG. 5 illustrates an example flow diagram of an example method that iterates through multiple interrupts with regard to limiting the rate at which system management interrupts can suspend normal execution of a central processing unit (CPU).

FIGS. 4 and 5 represent example processes implemented in accordance with various examples from the description of FIGS. 1-3. The example operations shown in FIGS. 4 and 5 can be implemented on or otherwise embodied in a computing device 102, as shown in FIG. 1.

The order in which the operations are described is not intended to be construed as a limitation, and any number of the described operations can be combined in any order and/or in parallel to implement each process. Moreover, the operations in FIGS. 4 and 5 can be implemented in hardware, software, and/or a combination thereof. In the context of software, the operations represent computer-executable instructions that, when executed by one or more processing units, cause the one or more processing units to perform the recited operations. For example, modules and other components described herein can be stored in a computer-readable storage media and executed by at least one processing unit to perform the described operations.

FIG. 4 illustrates a flow diagram of an example method 400 for limiting the rate at which system management interrupts can suspend normal execution of a central processing unit (CPU). The operations in FIG. 4 can be implemented by the firmware agent 114 (e.g., a baseboard management controller (BMC).

At operation 402, the firmware agent defines a threshold number of interrupts that are allowed to switch the operating mode of the central processing unit from the real operating mode or the protected operating mode to the system management operating mode.

At operation 404, the firmware agent tracks a number of interrupts that have been allowed to switch the operating mode of the central processing unit from the real operating mode or the protected operating mode to the system management operating mode.

At operation 406, the firmware agent determines, based on the tracking, that the number of interrupts has satisfied the threshold number of interrupts.

At operation 408, the firmware agent prevents, based on the determining, additional interrupts from being allowed to switch the operating mode of the central processing unit from the real operating mode or the protected operating mode to the system management operating mode.

FIG. 5 illustrates a flow diagram of an example method 500 that iterates through multiple interrupts with regard to limiting the rate at which system management interrupts can suspend normal execution of a central processing unit (CPU). The operations in FIG. 5 can be implemented by the firmware agent 114 (e.g., a baseboard management controller (BMC).

At operation 502, the firmware agent defines a threshold number of interrupts that are allowed to switch the operating mode of the central processing unit from the real operating mode or the protected operating mode to the system management operating mode;

At operation 504, the firmware agent receives an interrupt invocation request.

At operation 506, the firmware agent determines whether a current number of interrupts that have been allowed to switch the operating mode of the central processing unit from the real operating mode or the protected operating mode to the system management operating mode satisfies (e.g., is equal to) the threshold number of interrupts.

If it is determined at operation 506 that the current number of interrupts that have been allowed to switch the operating mode of the central processing unit from the real operating mode or the protected operating mode to the system management operating mode does not satisfy the threshold number of interrupts (e.g., the current number is less than the threshold number), the process proceeds to operation 508 where the firmware agent invokes an interrupt based on the interrupt invocation request. Further, at operation 510, the firmware agent increments the current number of interrupts by one. The process can then return to operation 504 when the next interrupt invocation request is received.

On the other side, if it is determined at operation 506 that the current number of interrupts that have been allowed to switch the operating mode of the central processing unit from the real operating mode or the protected operating mode to the system management operating mode does satisfy the threshold number of interrupts (e.g., the current number is already equal to the threshold number), the process proceeds to operation 512 where the firmware agent prevents an interrupt from being invoked based on the interrupt invocation request. The process can then return to operation 504 when the next interrupt invocation request is received.

Figure 6:
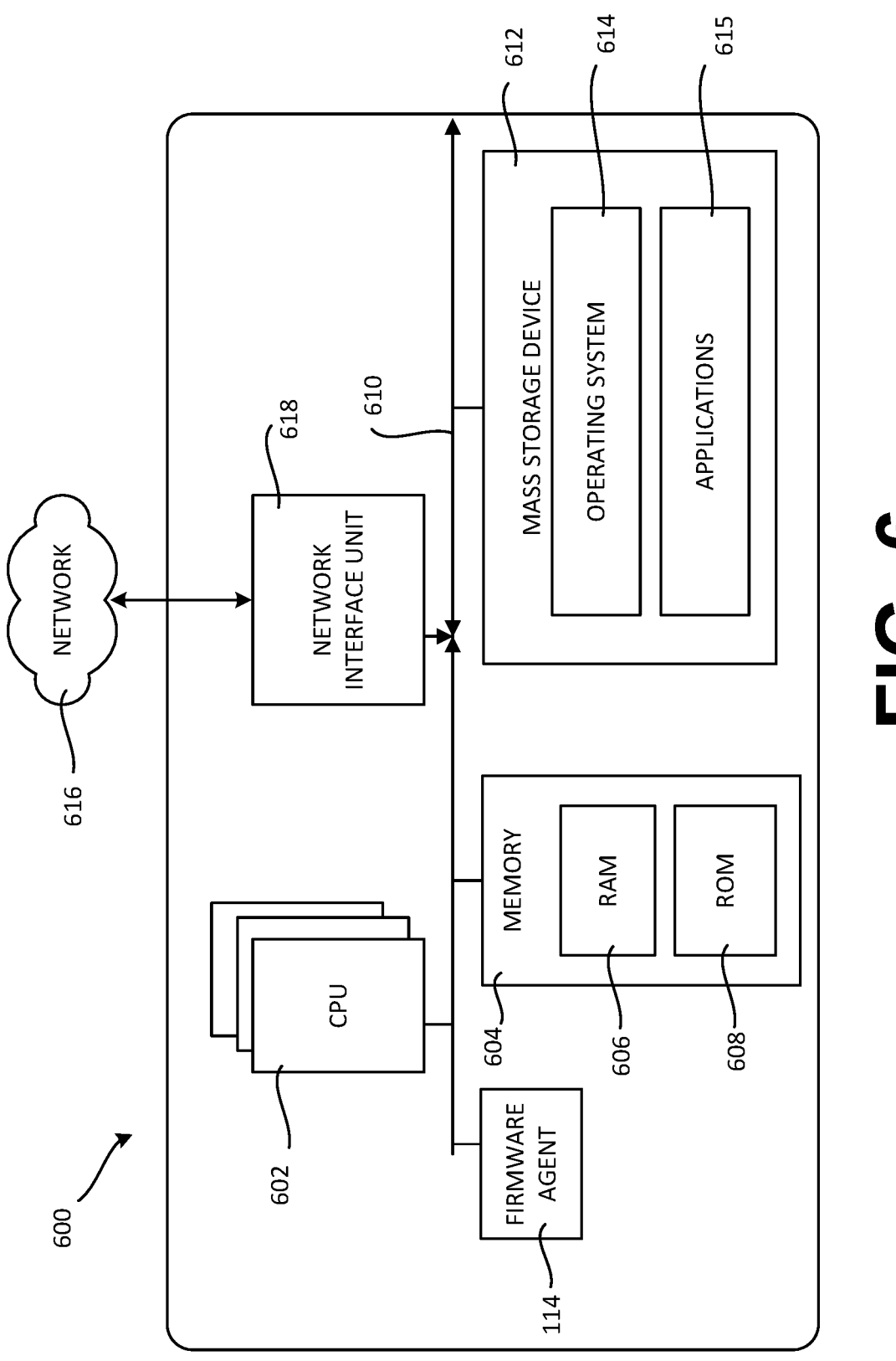
FIG. 6 is an example computer architecture diagram illustrating an illustrative computer hardware and software architecture for a computing system capable of implementing aspects of the techniques and technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement the computing device 102 in FIG. 1.

The computing device 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computing device 600, such as during startup, can be stored in the ROM 608. The computing device 600 further includes a mass storage device 612 for storing an operating system 614, applications 615, and/or other types of programs.

The mass storage device 612 is connected to the CPU 602 through a mass storage controller connected to the bus 610. The mass storage device 612 and its associated computer readable media provide non-volatile storage for the computing device 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," and variations thereof, does not include waves or signals per se or communication media.

According to various configurations, the computing device 600 can operate in a networked environment using logical connections to remote computers through a network such as the network 616. The computing device 600 can connect to the network 616 through a network interface unit 618 connected to the bus 610. It should be appreciated that the network interface unit 618 can also be utilized to connect to other types of networks and remote computer systems.

It should be appreciated that the software components described herein, when loaded into the CPU 602 and executed, can transform the CPU 602 and the overall computing device 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602. FIG. 6 further illustrates that the firmware agent 114 is also connected to the bus 610.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

The disclosure presented herein also encompasses the subject matter set forth in the following clauses.

Example Clause A, a method implemented by a firmware agent for limiting a number of illegitimate interrupts from switching an operating mode of a central processing unit from a real operating mode or a protected operating mode to a system management operating mode, comprising: defining a threshold number of interrupts that are allowed to switch the operating mode of the central processing unit from the real operating mode or the protected operating mode to the system management operating mode; tracking a number of interrupts that have been allowed to switch the operating mode of the central processing unit from the real operating mode or the protected operating mode to the system management operating mode; determining, based on the tracking, that the number of interrupts has satisfied the threshold number of interrupts; and preventing, based on the determining, additional interrupts from being allowed to switch the operating mode of the central processing unit from the real operating mode or the protected operating mode to the system management operating mode.

Example Clause B, the method of Example Clause A, wherein the threshold number of interrupts is defined for a predetermined period of time and the tracking is implemented during the predetermined period of time.

Example Clause C, the method of Example Clause B, wherein the threshold number of interrupts is statically defined for the predetermined period of time.

Example Clause D, the method of Example Clause B, wherein the threshold number of interrupts is dynamically defined for the predetermined period of time.

Example Clause E, the method of any one of Example Clauses A through D, wherein the firmware agent comprises a baseboard management controller.

Example Clause F, the method of Example Clause E, wherein the baseboard management controller is configured to allow an interrupt to switch the operating mode of the central processing unit from the real operating mode or the protected operating mode to the system management operating mode via toggling a General-Purpose Input-Output pin.

Example Clause G, the method of any one of Example Clauses A through F, wherein the threshold number of interrupts is defined for a particular type of interrupt and the method further comprises storing the threshold number of interrupts defined for the particular type of interrupt in a table.

Example Clause H, the method of Example Clause G, further comprising: defining other threshold numbers of interrupts that are allowed to switch the operating mode of the central processing unit from the real operating mode or the protected operating mode to the system management operating mode for other respective types of interrupts; and storing the other threshold number of interrupts defined for the other respective types of interrupt in the table.

Example Clause I, the method of Example Clause H, wherein a type of interrupt is mapped to an entry in the table based on an interface at which an interrupt invocation request is received.

Example Clause J, a method implemented by a firmware agent for limiting a number of illegitimate interrupts from switching an operating mode of a central processing unit from a real operating mode or a protected operating mode to a system management operating mode, comprising: defining a threshold number of interrupts that are allowed to switch the operating mode of the central processing unit from the real operating mode or the protected operating mode to the system management operating mode; receiving a first interrupt invocation request; determining that a current number of interrupts that have been allowed to switch the operating mode of the central processing unit from the real operating mode or the protected operating mode to the system management operating mode does not satisfy the threshold number of interrupts; in response to determining that the current number of interrupts that have been allowed to switch the operating mode of the central processing unit from the real operating mode or the protected operating mode to the system management operating mode does not satisfy the threshold number of interrupts, invoking a first interrupt, based on the first interrupt invocation request, that switches the operating mode of the central processing unit from the real operating mode or the protected operating mode to the system management operating mode; incrementing the current number of interrupts by one; receiving a second interrupt invocation request; determining that the current number of interrupts that have been allowed to switch the operating mode of the central processing unit from the real operating mode or the protected operating mode to the system management operating mode satisfies the threshold number of interrupts; and in response to determining that the currently tracked number of interrupts that have been allowed to switch the operating mode of the central processing unit from the real operating mode or the protected operating mode to the system management operating mode satisfies the threshold number of interrupts, preventing a second interrupt from being invoked based on the second interrupt invocation request.

Example Clause K, the method of Example Clause J, wherein the threshold number of interrupts is defined for a predetermined period of time and the current number of interrupts is reset to zero upon expiration of the predetermined period of time.

Example Clause L, the method of Example Clause K, wherein the threshold number of interrupts is statically defined for the predetermined period of time.

Example Clause M, the method of Example Clause K, wherein the threshold number of interrupts is dynamically defined for the predetermined period of time.

Example Clause N, the method of any one of Example Clauses J through M, wherein the firmware agent comprises a baseboard management controller.

Example Clause O, the method of Example Clause N, wherein the baseboard management controller is configured to invoke the first interrupt via toggling a General-Purpose Input-Output pin.

Example Clause P, the method of any one of Example Clauses J through O, wherein the threshold number of interrupts is defined for a particular type of interrupt and the method further comprises storing the threshold number of interrupts defined for the particular type of interrupt in a table.

Example Clause Q, a baseboard management controller configured to perform operations comprising: tracking a number of interrupts that have been allowed to switch an operating mode of a central processing unit from a real operating mode or a protected operating mode to a system management operating mode; determining, based on the tracking, that the number of interrupts has satisfied a threshold number of interrupts; and preventing, based on the determining, additional interrupts from being allowed to switch the operating mode of the central processing unit from the real operating mode or the protected operating mode to the system management operating mode.

Example Clause R, the baseboard management controller of Example Clause Q, wherein the threshold number of interrupts is defined for a predetermined period of time and the tracking is implemented during the predetermined period of time.

Example Clause S, the baseboard management controller of Example Clause Q or Example Clause R, wherein the threshold number of interrupts is defined for a particular type of interrupt and the operations further comprise storing the threshold number of interrupts defined for the particular type of interrupt in a table.

Example Clause T, the baseboard management controller of Example Clause S, wherein the operations further comprise: defining other threshold numbers of interrupts that are allowed to switch the operating mode of the central processing unit from the real operating mode or the protected operating mode to the system management operating mode for other respective types of interrupts; and storing the other threshold number of interrupts defined for the other respective types of interrupt in the table.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different types, two different requests, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method implemented by a baseboard management controller for limiting a number of illegitimate interrupts from switching an operating mode of a central processing unit from a real operating mode or a protected operating mode to a system management operating mode, the method comprising:

defining, for each of a plurality of different types of interrupts, a threshold number of interrupts that are allowed to switch the operating mode of the central processing unit from the real operating mode or the protected operating mode to the system management operating mode, wherein:

the baseboard management controller is configured to respectively manage the plurality of different types of interrupts via a plurality of different interfaces; and the threshold number of interrupts defined for a first type of interrupt is different than the threshold number of interrupts defined for a second type of interrupt;

tracking, via a respective interface for the first type of interrupt, a number of interrupts that have been allowed to switch the operating mode of the central processing unit from the real operating mode or the protected operating mode to the system management operating mode;

determining, based on the tracking, that the number of interrupts has satisfied the threshold number of interrupts defined for the first type of interrupt; and preventing, based on the determining, additional interrupts of the first type of interrupt from being allowed to switch the operating mode of the central processing unit from the real operating mode or the protected operating mode to the system management operating mode.

2. The method of claim 1, wherein the threshold number of interrupts defined for the first type of interrupt is further defined for a predetermined period of time and the tracking is implemented during the predetermined period of time.

3. The method of claim 2, wherein the threshold number of interrupts defined for the first type of interrupt is statically defined for the predetermined period of time.

4. The method of claim 2, wherein the threshold number of interrupts defined for the first type of interrupt is dynamically defined for the predetermined period of time.

5. The method of claim 1, wherein the baseboard management controller is configured to allow an interrupt to switch the operating mode of the central processing unit from the real operating mode or the protected operating mode to the system management operating mode via toggling a General-Purpose Input-Output pin.

6. The method of claim 1, further comprising storing the threshold number of interrupts defined for the first type of interrupt in a table.

7. The method of claim 1, wherein the plurality of different types of interrupts are mapped to entries in a table storing the threshold number of interrupts defined for each of the plurality of different types of interrupts based on the plurality of different interfaces at which an interrupt invocation request is received.

8. The method of claim 1, wherein:

the first type of interrupt is invoked to manage or debug an error in system hardware;

the second type of interrupt is invoked to implement telemetry harvesting; and a third type of interrupt is invoked to implement a power control function.

9. A method implemented by a baseboard management controller for limiting a number of illegitimate interrupts from switching an operating mode of a central processing unit from a real operating mode or a protected operating mode to a system management operating mode, the method comprising:

defining, for each of a plurality of different types of interrupts, a threshold number of interrupts that are allowed to switch the operating mode of the central processing unit from the real operating mode or the protected operating mode to the system management operating mode, wherein:

the baseboard management controller is configured to respectively manage the plurality of different types of interrupts via a plurality of different interfaces; and the threshold number of interrupts defined for a first type of interrupt is different than the threshold number of interrupts defined for a second type of interrupt;

receiving a first interrupt invocation request via a respective interface for the first type of interrupt;

determining that a current number of interrupts, for the first type of interrupt, that have been allowed to switch the operating mode of the central processing unit from the real operating mode or the protected operating mode to the system management operating mode does not satisfy the threshold number of interrupts defined for the first type of interrupt;

in response to determining that the current number of interrupts, for the first type of interrupt, that have been allowed to switch the operating mode of the central processing unit from the real operating mode or the protected operating mode to the system management operating mode does not satisfy the threshold number of interrupts defined for the first type of interrupt, invoking a first interrupt, based on the first interrupt invocation request, that switches the operating mode of the central processing unit from the real operating mode or the protected operating mode to the system management operating mode;

incrementing the current number of interrupts, for the first type of interrupt, by one;

receiving a second interrupt invocation request via a respective interface for the first type of interrupt;

determining that the current number of interrupts, for the first type of interrupt, that have been allowed to switch the operating mode of the central processing unit from the real operating mode or the protected operating mode to the system management operating mode satisfies the threshold number of interrupts defined for the first type of interrupt; and in response to determining that the current number of interrupts, for the first type of interrupt, that have been allowed to switch the operating mode of the central processing unit from the real operating mode or the protected operating mode to the system management operating mode satisfies the threshold number of interrupts defined for the first type of interrupt, preventing a second interrupt from being invoked based on the second interrupt invocation request.

10. The method of claim 9, wherein the threshold number of interrupts defined for the first type of interrupt is further defined for a predetermined period of time and the current number of interrupts is reset to zero upon expiration of the predetermined period of time.

11. The method of claim 10, wherein the threshold number of interrupts defined for the first type of interrupt is statically defined for the predetermined period of time.

12. The method of claim 10, wherein the threshold number of interrupts defined for the first type of interrupt is dynamically defined for the predetermined period of time.

13. The method of claim 9, wherein the baseboard management controller is configured to invoke the first interrupt via toggling a General-Purpose Input-Output pin.

14. The method of claim 9, further comprising storing the threshold number of interrupts defined for the first type of interrupt in a table.

15. The method of claim 9, wherein the plurality of different types of interrupts are mapped to entries in a table storing the threshold number of interrupts defined for each of the plurality of different types of interrupts based on the plurality of different interfaces at which an interrupt invocation request is received.

16. A baseboard management controller configured to perform operations comprising:

tracking, via a respective interface for each of a plurality of different types of interrupts, a number of interrupts that have been allowed to switch an operating mode of a central processing unit from a real operating mode or a protected operating mode to a system management operating mode;

determining, based on the tracking, that the number of interrupts for a first type of interrupt has satisfied a threshold number of interrupts defined for the first type of interrupt, wherein the threshold number of interrupts defined for the first type of interrupt is different than a threshold number of interrupts defined for a second type of interrupt; and preventing, based on the determining, additional interrupts for the first type of interrupt from being allowed to switch the operating mode of the central processing unit from the real operating mode or the protected operating mode to the system management operating mode.

17. The baseboard management controller of claim 16, wherein the threshold number of interrupts defined for the first type of interrupt is further defined for a predetermined period of time and the tracking is implemented during the predetermined period of time.

18. The baseboard management controller of claim 16, wherein the operations further comprise storing the threshold number of interrupts defined for the first type of interrupt in a table.

19. The baseboard management controller of claim 16, wherein each of the plurality of different types of interrupts has a dedicated General-Purpose Input-Output pin for switching the operating mode of the central processing unit from the real operating mode or the protected operating mode to the system management operating mode.

20. The baseboard management controller of claim 16, wherein the plurality of different types of interrupts are mapped to entries in a table storing the threshold number of interrupts defined for each of the plurality of different types of interrupts based on a plurality of different interfaces at which an interrupt invocation request is received.

* * * * *